Oct. 30, 1928.
G. VAN G. GRANGER
RUG BAG
Re. 17,118
Original Filed July 17, 1925
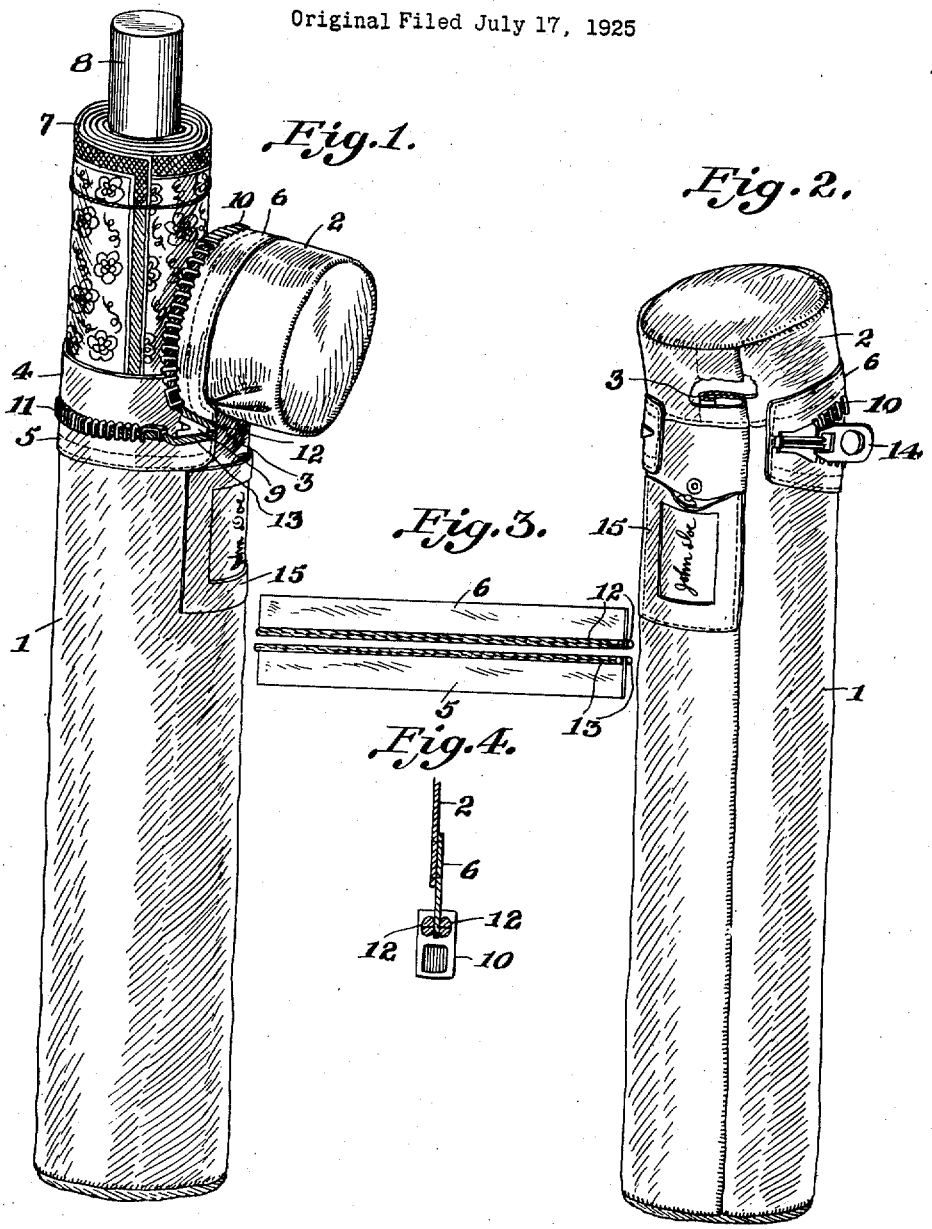
Inventor
Gertrude Van Giesen Granger
By Mason Fenwick & Lawrence
Attorneys Reissued Oct. 30, 1928. Re. 17,118

UNITED STATES PATENT OFFICE.

GERTRUDE VAN GIESEN GRANGER, OF SAVANNAH, GEORGIA, ASSIGNOR TO MOTH-PROOF RUG BAG COMPANY, OF CHATHAM COUNTY, GEORGIA, A CORPORATION.

RUG BAG.

Original No. 1,581,535, dated April 20, 1926, Serial No. 44,327, filed July 17, 1925. Application for reissue filed August 17, 1927, Serial No. 213,939.

This invention relates to improvements in bags, more specifically moth-proof rug bags.

The object of the bag is to furnish the housewife with a convenient receptacle in which to place her rugs while not in use and thus protect them from dust and destructive insects, such as moths. Briefly stated, the use of the bag is as follows:

The rug to be protected is rolled on a pole, the bag opened and the rug placed therein. The bag carries a permanently attached top, with a reinforced segment in back which acts as a hinge, with closure means for placing the bag in a moth-proof, dust-proof condition.

The novelty of the bag lies chiefly in using a section of the bag as a hinge for the top.

A further improvement is mounting the closure means on beading, the beading in turn being mounted on tape which, in turn, is mounted on the bag in such a way as to allow the edge of the bag to project up into the top and so make a dust-proof, moth-proof joint.

Other novelty lies in the use of a triangular clasp in the corner of the opening of the bag, so as to keep the bag, when the bag is not drawn shut, in a semi-open position, which facilitates the placing of rugs therein.

In the drawings,

Figure 1 is a perspective of the bag in opened position, with the rug partly inserted therein.

Figure 2 is a rear elevation showing the bag in semi-closed position with a part of the rear broken away.

Figure 3 is a plan view of fastener carrying tapes.

Figure 4 is a fragmentary cross-sectional view drawn through the top, tape and fastener.

As shown in Figure 1, the invention comprises a bag 1, open, with top 2 held in position by segment of the bag 3, used as a hinge to swing the top into a closed position when the bag is desired to be shut.

Top 2 is in such relative position as to allow the edge of bag 4 to project beyond the closure means 11 and thus prevent dust and insects from entering when the bag is in a closed position and also protects the contents of the bag from chafing on the closure means 11.

The top 2 is fastened to a tape 6, which runs around the bottom of the top to the side of hinged section 3. A similar tape continues around the bag below top 4, as at 5. Each of these tapes are secured to the top and bag respectively, by a line of stitching adjacent its lower edge, so that the adjacent edges of tapes are left free. On the free edges of these tapes is mounted closure means 10 and 11. At the juncture of the tapes 6 and 5, adjacent to the hinge 3, is a triangular shaped clasp 9, which serves to keep the bag 1 in a semi-opened condition when the fastening means 10 and 11 are not drawn shut. The triangular metal clasp acts as a wedge, the point of the triangle being positioned in the corner of the opening of the bag. When the closure means is not in operation, the bag will be kept in a semi-open position by said clasp acting as a wedge. This facilitates the placing of rugs in the bag and yet when the bag is in a closed position presents no opening for moths or other insects to enter as the flap on the inside will cover any crevice left. A name plate 15 is shown in connection with bag 1.

In Figure 2, hinged section 3 is shown reinforced by an interlocking of the folds of the cloth in the form of a seam. The closure means 10 and 11 is operated by a pulling member 14.

In Figure 3, tapes 6 and 5 which are fastened on the top 2 and bag 4 as described, show attached to the edges of tapes, beading 12 and 13 respectively, upon which closing means is strung.

In Figure 4, the top 2 is shown attached to tape 6, and the beading 12 attached thereon, with the closing means attached thereto.

What I claim is:

1. In a tubular bag, a top, the top attached to the bag by means of a section of the bag, said section acting as a hinge, a closure means, the closure means having a triangular clasp between the edges of the closure means in order to keep the bag in a semi-open position.

2. A tubular bag of flexible material having a section thereof projecting beyond the open end thereof, a top secured to said section, said section forming a hinge, cooperative interlocking means fixed to said bag below the open end thereof and to the hinged edge of said top, and means slidably connected to said interlocking means to draw the top into locked engagement with the end of said bag projecting into said top.

3. A tubular bag of flexible material, a tubular top fitting snugly over the open end of said bag and hinged thereto below said end, cooperative interlocking means fixed around said bag below said end and around the edge of said top on opposite sides of the hinge connection therebetween, and means slidably connected to said interlocking means to draw the top into locked engagement with the end of said bag projecting into said top.

4. A tubular bag of flexible material having a tubular closure hinged to said bag below the open end thereof, cooperative interlocking means fixed to said bag and top, and means slidable along said interlocking means to move said top into closed locked position on said bag or to open position thereon.

In testimony whereof I affix my signature.

GERTRUDE VAN GIESEN GRANGER.